May 11, 1954

J. S. SABODA 2,677,887

CIRCULAR CUTTER

Filed June 16, 1951

INVENTOR
John S. Saboda
BY
Pennie Edmonds Morton Barrows Taylor
ATTORNEYS

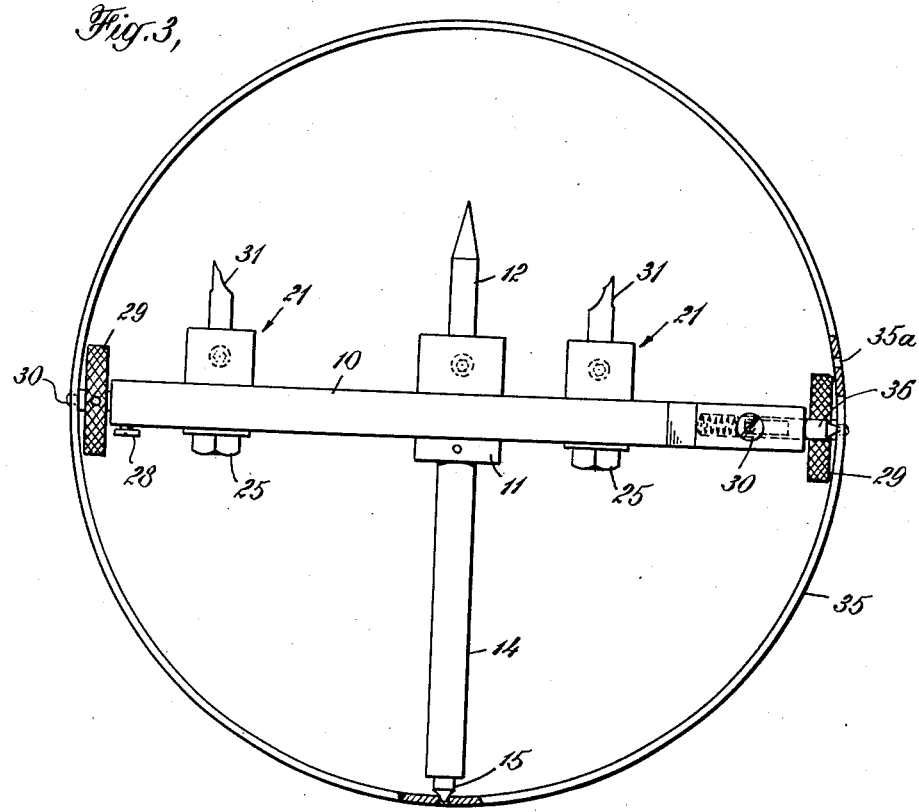
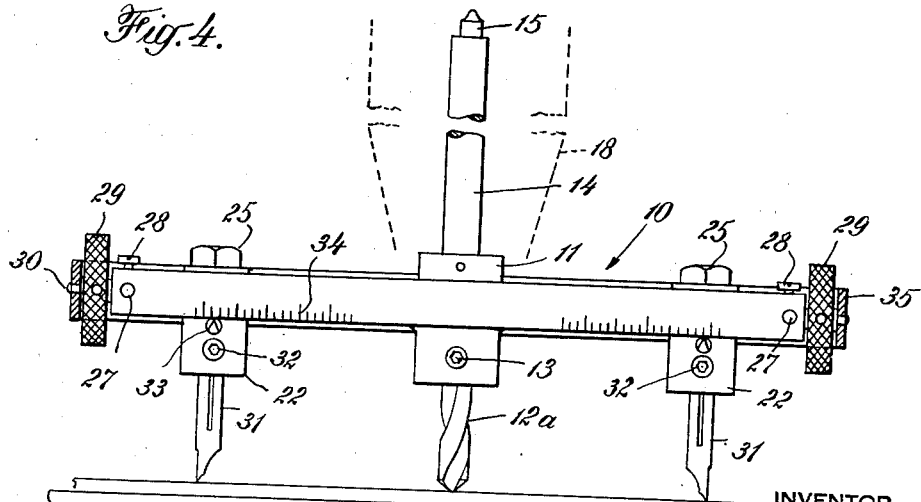

Patented May 11, 1954

2,677,887

UNITED STATES PATENT OFFICE 2,677,887

CIRCULAR CUTTER

John S. Saboda, Brooklyn, N. Y., assignor to Waugh Equipment Company, New York, N. Y., a corporation of Maine Application June 16, 1951, Serial No. 231,975

2 Claims. (Cl. 30—152)

This invention relates to circular cutters for use in making circular cuts in sheets of material for the production of discs, washers, etc. More particularly, the invention is concerned with a novel circular cutter which is provided with a guard, which protects the user from having his clothing caught on a part of the cutter, when it is operating, and may also be used as a protection for the cutting tools, when the cutter is stored.

The new cutter comprises a bar carrying a centering element mounted midway between the ends of the bar and extending from one side of the bar at right angles thereto. A stem receivable in a chuck extends from the opposite side of the bar in alignment with the element. A tool holder is mounted on the bar for movement lengthwise of the bar and the tool holder is constructed to hold a tool projecting from the same side of the bar as the centering element and parallel thereto. A circular guard is mounted on aligned pivots at opposite ends of the bar and the stem and centering element are shorter than the radius of the guard as is also a tool held in the tool holder. The bar is provided with means for holding the guard in the plane of the bar and, when the guard is in this position and the cutter is being rotated on the common axis of the centering element and stem by rotation of the chuck, the guard prevents clothing from being caught on the bar. The stem is also provided with means for holding the guard in the plane of the common axis of the centering element and stem and, when the cutter is to be stored, the stem is removed from the chuck and the guard swung until the holding means on the stem engages the guard. In this position of the guard, the stem, centering element, and tool all lie in the plane of the guard.

For a better understanding of the invention, reference may be made to the accompanying drawings, in which Fig. 1 is a sectional view of one form of the new cutter on the line 1—1 of Fig. 2;

Fig. 3 is a top plan view of the cutter in condition for storage; and

Fig. 4 is a sectional view on the line 4—4 of Fig. 2.

Figure 1:
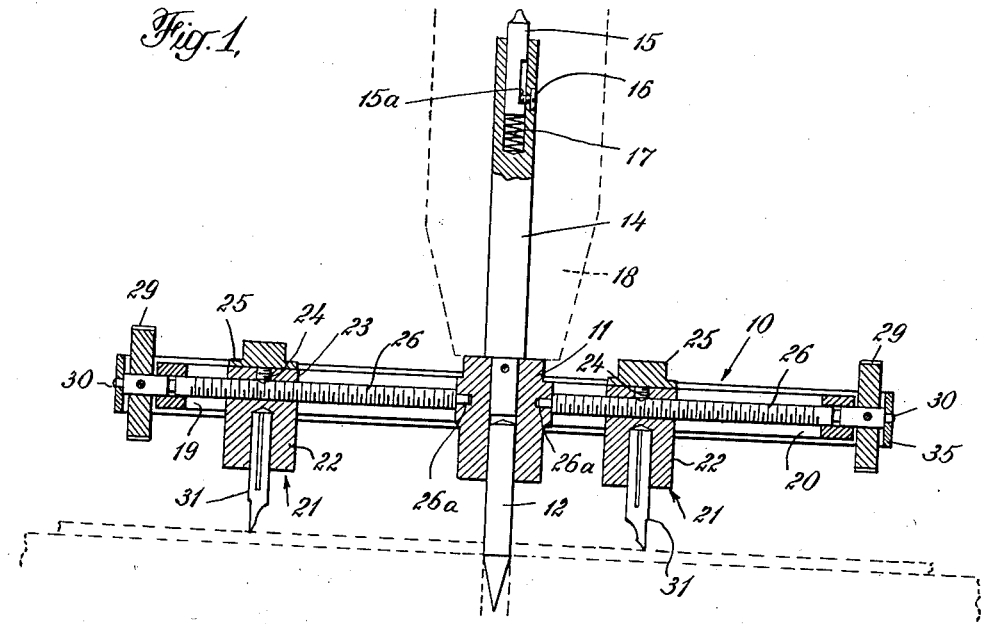
Figure 2:
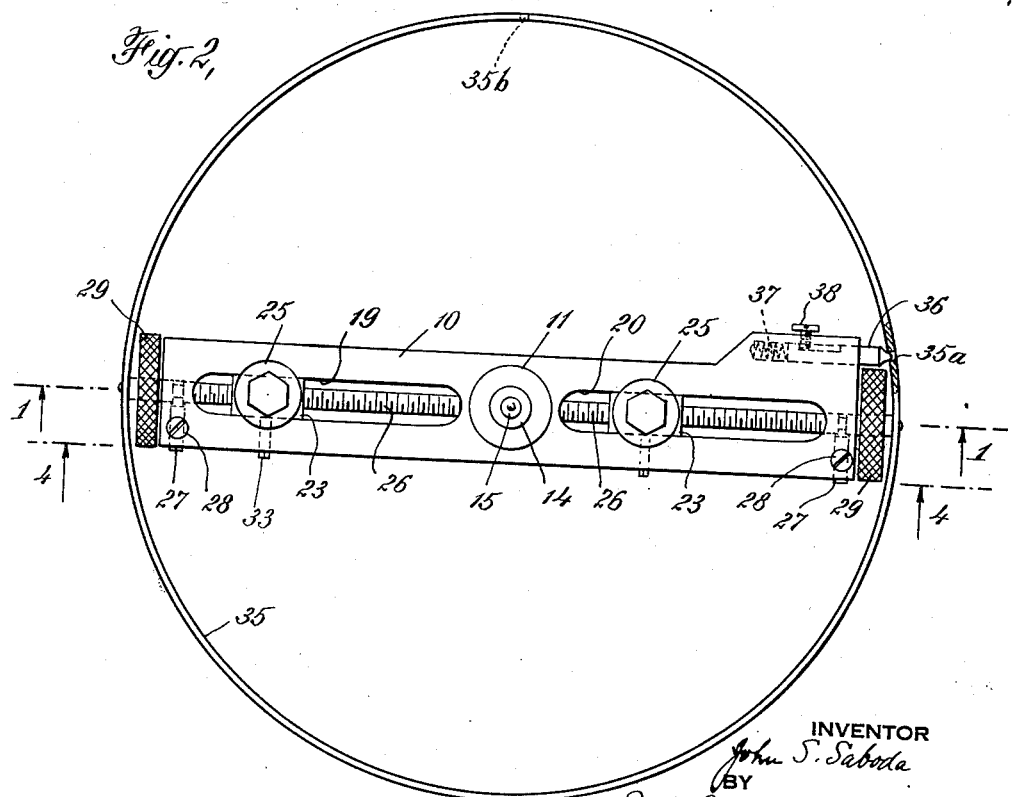
Fig. 2 is a top plan view of the cutter in condition for use.

The new cutter in the form illustrated comprises a bar 10, which is made of a suitable metal and is ordinarily oblong in section. The bar is provided with a vertical boss 11 midway between its ends and the boss has an axial passage, in the lower end of which is mounted a centering element projecting downwardly below the lower end of the boss. The centering element may take the form of a pointed rod 12 or of a drill 12a, and it is held in place by a set screw 13 threaded into an opening in the boss and having a socketed head.

A stem 14 is inserted in the upper end of the passage through boss 11 and projects upwardly in alignment with the centering element 12. The stem has a pin 15 in an axial recess in its outer end, the pin being held in place by a screw 16, which is threaded in an opening in the stem leading to the recess and enters a lengthwise slot 15a in the pin. The screw permits the pin to move endwise the length of the slot and the pin is urged outwardly by a spring 17 within the recess in the stem. The stem is adapted to be received in a chuck, indicated at 18, which is rotated by power and carried by part of a machine tool, such as a drill press.

The bar 10 is formed with a pair of vertical slots 19, 20 leading outward from boss 11 to near the opposite ends of the bar and a tool holder 21 is mounted for sliding movement in each slot. Each tool holder comprises a block 22 having a neck 23 extending through a slot and the tool holder may be held in place by a screw 24, threaded into the top of the block and having a head formed with a flange 25 of greater diameter than the width of the slot. Each tool holder has a threaded opening through it in the direction of the length of its slot, and a threaded rod 26 passes through an opening in the end of the bar and through the opening in the tool holder. The rod has a reduced inner end 26a received in a socket in the boss 11 and is held against endwise movement by a pin 27 extending through an opening in the side of the bar and entering a circumferential channel in the rod, the pin being held in place by a set screw 28. The rod carries a knurled disc 29 beyond the end of the bar 10 and the end of the rod is of reduced diameter to form a pivot 30.

Each tool holder has an axial opening extending inward from its lower end for receiving a cutting tool 31 held in place by a set screw 32, preferably having a socketed head. Each tool holder is also provided with a pointer 33, which extends radially from block 22 and lies close to the under surface of bar 10. The bar has a scale 34 on its vertical side, toward which the pointer extends, the reading of the pointer on the scale indicating the radius of the circle, which will be cut by a tool in the holder.

A circular guard 35 of flat strip stock is mounted on the pivots 30 on rods 26 at opposite ends of the bar and the bar is provided at one end with a lengthwise recess containing a pin 36 urged outwardly by a spring 37 and prevented from being fully displaced by a screw 38. The pin 36 has a pointed outer end receivable in an opening 35a in the guard to hold the guard in the plane of the bar, and the guard has another opening 35b receiving the end of pin 15 to hold the guard with its plane passing through the common axes of the centering element 12 and the stem 14.

When the cutter is stored, the guard is swung so that the pin 15 enters opening 35b. In this position of the guard, it serves to protect the sharp edges of the cutting tools 31 and the sharp point of the centering element 12. When the tool is to be used, the guard is swung into the plane of the bar and the stem 14 inserted into chuck 18. If a circular cut is to be made and tools employed in both tool holders, the tool holders are moved outwardly in their slots so that the cutting edges of the tool are the same distance from the axis of the centering element. This is done by turning the knurled discs 29 until the pointers 33 on the tool holders lie at the same reading on scales 34. If only a single tool is to be used, it is mounted in one tool holder and the other, without a tool, may then lie at any desired place in its slot. If an annulus is to be cut, both tool holders are equipped with tools and one is disposed at such a distance from the axis of the centering element as to cut the inner edge of the annulus, and the other tool holder is then moved further out in its slot to make the outer cut. When either knurled disc is turned to rotate its rod 26, the tool holder, through which the rod passes, is moved lengthwise of its slot in a direction depending upon the direction of rotation of the rod. The screw 24 associated with the rod is then turned in against the rod to hold the tool holder in fixed position. During the use of the circular cutter, the guard lying in the plane of the bar prevents accidental contact with the rotating bar and protects the user against having his clothing caught by some part of the cutter.

I claim:

1. A circular cutter which comprises a bar, a centering element on the bar midway between the ends thereof and extending from one side of the bar at right angles thereto, a stem mounted on the bar and projecting from the other side thereof in alignment with the element, the stem being adapted to be received within a chuck, a tool holder mounted on the bar for movement lengthwise thereof and being constructed to hold a tool extending from the same side of the bar as the element and parallel to the element, a circular guard mounted on aligned pivots at the ends of the bar, means on the bar engageable with the guard for holding the guard in a plane through the bar and normal to the common axis of the stem and element, the stem and the element each being shorter than the radius of the guard, and means on the stem engageable with the guard for holding the guard in a plane through the bar and the common axis of the stem and element.

2. A circular cutter which comprises a bar, a centering element on the bar midway between the ends thereof and extending from one side of the bar at right angles thereto, a stem mounted on the bar and projecting from the other side thereof in alignment with the element, the stem being adapted to be received within a chuck and having a spring-pressed plunger projecting axially from its free end, a tool holder mounted on the bar for movement lengthwise thereof and constructed to hold a tool extending from the same side of the bar as the element and parallel to the element, a circular guard mounted on aligned pivots at the ends of the bar, and means on the bar engageable with the guard for holding the guard in a plane through the bar and normal to th common axis of the stem and element, the element, the tool holder, and the stem all being shorter than the radius of the guard and the guard having an opening midway between the points at which the guard is pivoted to the ends of the bar for receiving the plunger on the stem when the guard is swung into a plane through the axes of the stem and tool holder.

References Cited in the file of this patent

UNITED STATES PATENTS

| Number | Name | Date |
| --- | --- | --- |
| 1,013,845 | Peaden | Jan. 2, 1912 |
| 1,401,813 | Popper | Dec. 27, 1921 |
| 1,809,993 | Swanson | June 16, 1931 |
| 2,050,194 | Pflueger | Aug. 4, 1936 |
| 2,551,778 | Wilson | May 8, 1951 |

FOREIGN PATENTS

| Number | Country | Date |
| --- | --- | --- |
| 7,086 | Great Britain | Apr. 24, 1891 |